United States Patent
Porter et al.

(10) Patent No.: US 6,548,934 B1
(45) Date of Patent: Apr. 15, 2003

(54) BRUSH HOLDER LEAD FRAME WITH INTEGRAL ELECTRICAL TERMINALS

(75) Inventors: Eugene B. Porter, Auburn Hills, MI (US); Otway A. Southall, Farmville, VA (US); Richard Q. Harding, Atlanta, GA (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 0 days.

(21) Appl. No.: 09/628,906

(22) Filed: Jul. 31, 2000

(51) Int. Cl.[7] .............................................. H01R 39/38
(52) U.S. Cl. ...................... 310/239; 310/249; 439/856
(58) Field of Search ................................. 310/239, 249, 310/238, 71, 89, 40 MM, 43; 439/874, 856–858, 736

(56) References Cited

U.S. PATENT DOCUMENTS

| | | | | |
|---|---|---|---|---|
| 4,366,403 A | * | 12/1982 | Simpson et al. | 310/239 |
| 4,682,840 A | * | 7/1987 | Lockard | 439/874 |
| 5,025,184 A | * | 6/1991 | Sekine et al. | 310/71 |
| 5,065,039 A | * | 11/1991 | Isozumi et al. | 290/48 |
| 5,148,073 A | * | 9/1992 | Tamura | 310/239 |
| 5,204,565 A | * | 4/1993 | Sekine et al. | 310/71 |
| 5,218,255 A | * | 6/1993 | Horiguchi | 310/71 |
| 5,598,045 A | * | 1/1997 | Ohtake et al. | 310/40 MM |
| 5,621,262 A | * | 4/1997 | Han | 310/239 |
| 5,825,114 A | * | 10/1998 | Mukai | 310/251 |
| 5,886,448 A | * | 3/1999 | Yoshida | 310/249 |
| 5,942,819 A | * | 8/1999 | Burgess et al. | 310/51 |
| 6,317,332 B1 | * | 11/2001 | Weber et al. | 361/760 |

FOREIGN PATENT DOCUMENTS

| | | | |
|---|---|---|---|
| EP | 0823768 | * | 2/1998 |
| GB | 2216342 | * | 10/1989 |

* cited by examiner

Primary Examiner—Joseph Waks
(74) Attorney, Agent, or Firm—Young & Basile, P.C.

(57) ABSTRACT

A motor brush lead frame having one end that is folded upon itself to form a pair of pinching surfaces which are adapted to pinch an electrical terminal to establish electrical contact with the electrical terminal. By folding the lead frame member upon itself to form a pair of pinching surfaces, the problems and costs associated with crimping or otherwise attaching a conventional electrical connector to the lead frame member are eliminated.

20 Claims, 2 Drawing Sheets

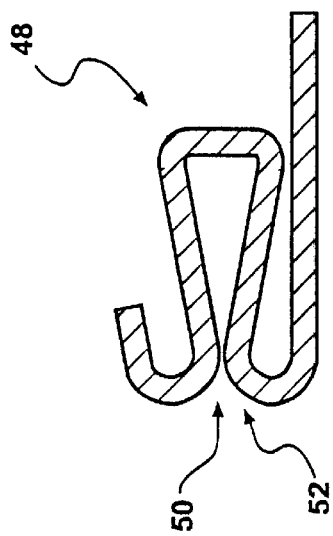
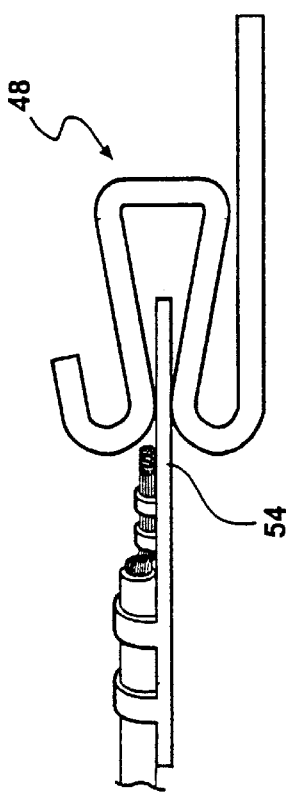
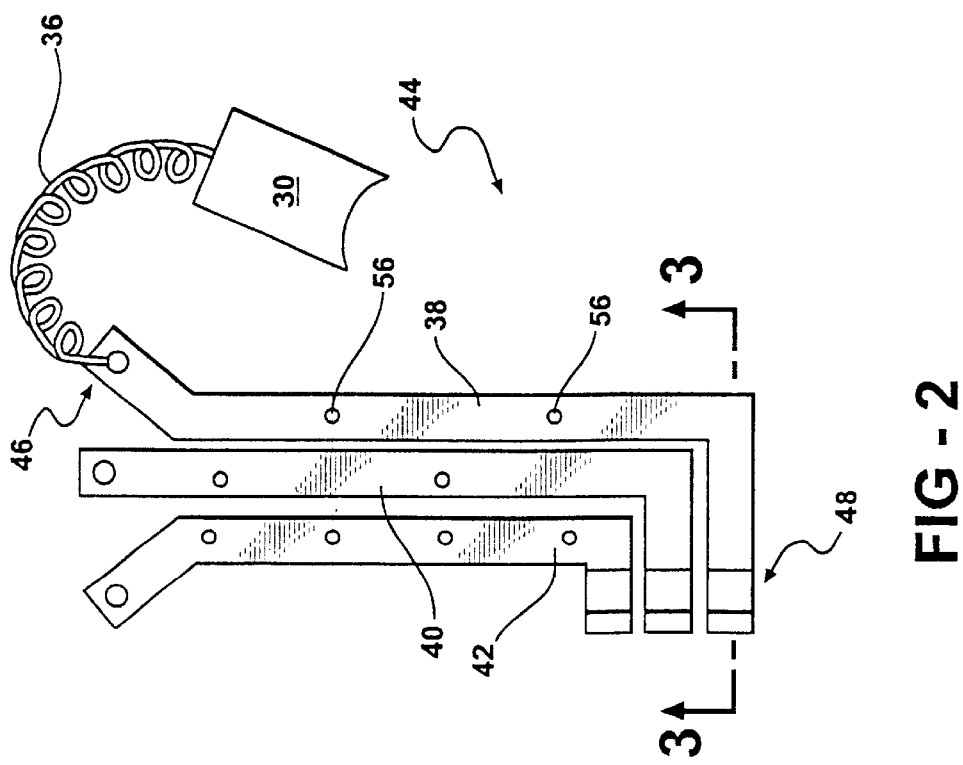

BRUSH HOLDER LEAD FRAME WITH INTEGRAL ELECTRICAL TERMINALS

TECHNICAL FIELD

This invention generally relates to electric motors and more particularly relates to fractional horsepower electric motors.

BACKGROUND OF THE INVENTION

Fractional horsepower electric motors are used in numerous automotive applications. For example, electric motors are used in automotive seat adjustment mechanisms, sideview mirror adjustment assemblies, and windshield wiper control mechanisms.

In the last several years, significant engineering effort has been expended on reducing the cost, and increasing the reliability of fractional horsepower electric motors used in automotive applications. One way to reduce cost and to increase motor reliability is to reduce or eliminate as many components as possible. The present invention provides both these advantages in that it eliminates a separate electrical connector which is commonly used in prior art designs and which is often a cause of motor failure. An additional benefit of the present invention is that it provides more precise electrical terminal positioning than that of the prior art.

SUMMARY OF THE INVENTION

The present invention provides a motor lead frame including a brush holder assembly and a lead frame member. The brush holder assembly can include a plurality of brushes. The lead frame member can be formed from a single piece of electrically conductive material. The lead frame member can include at least one end that forms a pair of pinching surfaces. The pinching surfaces can pinch an electrical connector to establish an electrical contact between the lead frame member and the electrical connector. The lead frame member can also include a plurality of holes to accommodate the flow of plastic therethrough during an assembly process of the brush holder assembly. The assembly of the lead frame member in situ with respect to the brush holder assembly can provide a durable marriage between the lead frame member and the brush holder assembly.

The invention can also include a second lead frame member and a third lead frame member. The second and third lead frame members can be similar to the lead frame member in that the all three lead frame members can be formed from a single piece of electrically conductive material and have at least one end that forms a pair of pinching surfaces to pinch an electrical connector and establish an electrical contact with the electrical connector. The pinching surfaces of the second and third lead frame members can be substantially parallel the pinching surfaces to the pinching surfaces of the lead frame member. In addition, the second and third lead frame members can also include a plurality of holes to accommodate the flow of plastic therethrough during an assembly process of the brush holder assembly.

Other applications of the present invention will become apparent to those skilled in the art when the following description of the best mode contemplated for practicing the invention is read in conjunction with the accompanying drawings.

BRIEF DESCRIPTION OF THE DRAWINGS

FIG. 2 is an elevational view of the lead frame and brush members of the brush holder assembly of FIG. 1.

FIG. 3 is an enlarged, cross-sectional view taken substantially through lines 3—3 of FIG. 2.

FIG. 4 shows the electrical connector of FIG. 3 in operational engagement with a male spade terminal.

DETAILED DESCRIPTION OF THE PREFERRED EMBODIMENT

Figure 1:
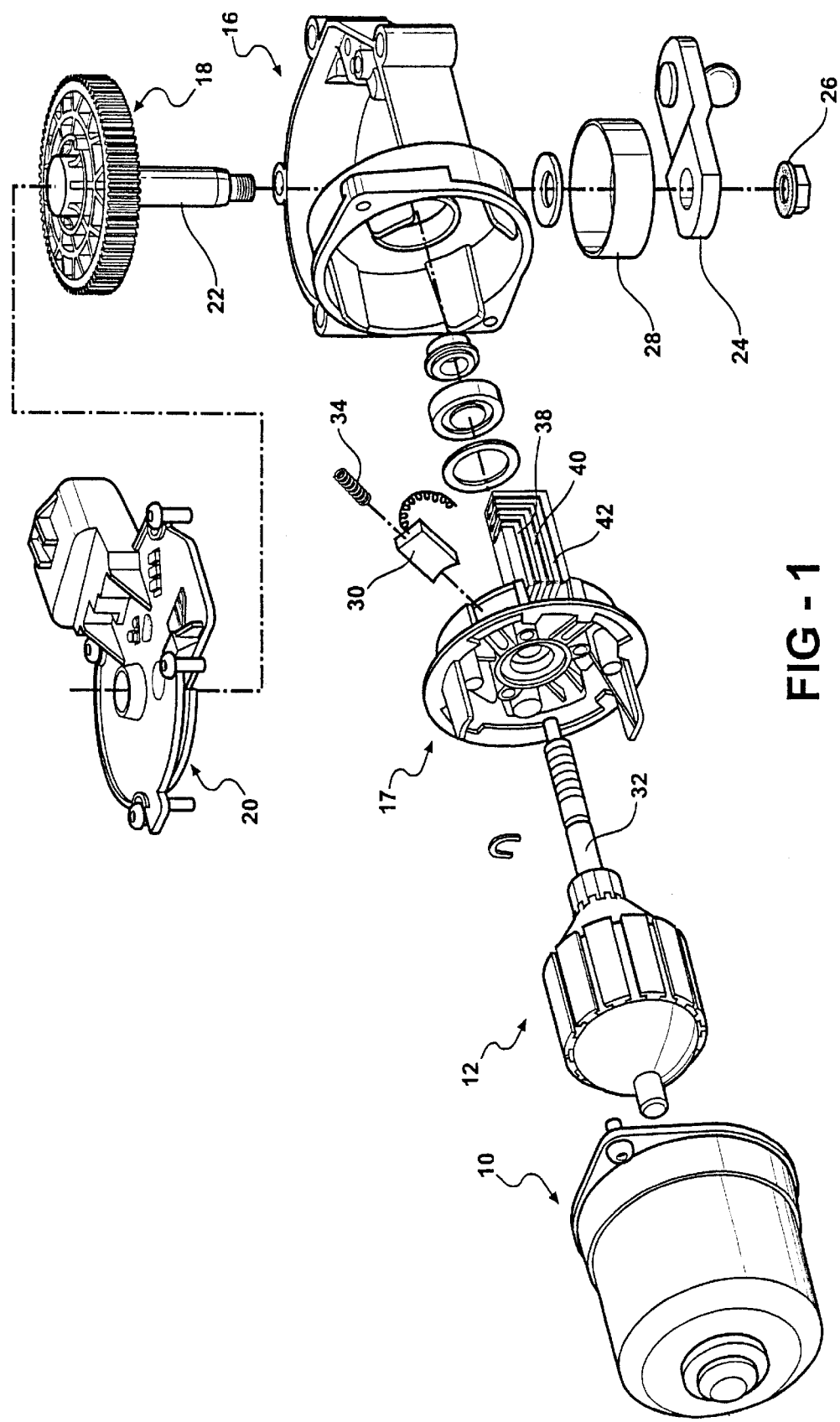
FIG. 1 is an exploded view of a motor which employs the brush holder lead frame of the present invention.

FIG. 1 shows a exploded view of a typical motor assembly employing the improved lead frame of the present invention. The motor depicted in FIG. 1 is specifically designed to operate the windshield wiper drive mechanism of a vehicle; however, it is to be understood that the improved lead frame design of the present invention is applicable for any electrical motor application even applications which are not confined to motor vehicles.

The motor assembly of FIG. 1 includes motor housing 10 and gear housing 16. Motor housing 10 includes permanent magnets mounted therein (permanent magnets not shown) and is adapted to cover rotor 12 and brush holder assembly 17. Gear housing 16 houses gear 18 and protects gear 18 from dirt and other contaminates by way of gear cover 20. Gear 18 includes working shaft 22 which is attached to link arm 24 by way of threaded nut 26. Link arm 24 is the arm which is attached to the windshield wiper linkage of the vehicle (not shown). Seal 28 prevents dirt and other contaminates from entering the opening (not visible in FIG. 1) of gear housing 16 through which shaft 22 exits.

Brush holder assembly 17 includes at least two brushes 30 (only one brush is shown in the exploded view of FIG. 1). It is well understood by those skilled in the design of DC motors, that a plurality of brushes 30 engage the commutator 32 portion of rotor 12 in order to electrify one or more windings carried by rotor 12. Brushes 30 are urged against commutator 32 by way of a respectively associated spring 34. A flexible braided wire 36 joins each brush 30 to a respectively associated lead frame member 38. Brush 30, flexible wire 36, and lead frame member 38 are all made from electrically conductive material such that they conduct electrical current without introducing significant electrical power loss.

Now referring to FIGS. 1 and 2, lead frame assembly 44 is shown in FIG. 1 as it exists in brush holder assembly 17; however, in FIG. 2, brush holder 17 is removed. Also, in FIG. 2, flexible wire 36 and brush 30 are shown attached to lead frame member 38 for purposes of clarity and illustration; however, the term lead frame member used throughout this application does not include flexible wire 36 or brush 30.

At end 46 of lead frame member 38 flexible wire 36 is fastened. Any number of fastening techniques can be used such as crimping, soldering, welding, or the like. The only critical aspect of the fastening is that it should not introduce any significant electrical resistance.

Now referring to FIGS. 2 and 3, end 48 of lead frame member 38 terminates into an electrical connector. This electrical connector is formed from the lead frame member 38 and accordingly, no fastening step is necessary. Specifically, end 48 of lead frame member 38 is folded upon itself to form a pair of pinching surfaces 50, 52. Pinching surfaces 50, 52 are closely adjacent to one another such that they frictionally engage male spade electrical connector 54 when it is forced between pinching surfaces 50, 52. In prior art designs, electrical connectors were crimped or soldered to the ends of lead frame member 38. The drawbacks associated with crimping electrical connectors include failure due to vibration, the ingress of contaminants, and fatigue failure based on excessive crimping forces used during the crimping operation. All of these disadvantages are eliminated from the current design. Specifically, because the electrical connector is formed from the lead frame member, it is integral therewith, and no crimping operation takes place. Because there is no crimping, there is no opportunity for the ingress of contaminants to compromise the electrical connection between the connector and lead frame member 38 and also, because no crimping operation takes place, there is no opportunity for fatigue failure due to the application of excessive force during the crimping operation.

Preferably, lead frame member 38 includes a plurality of holes 56 which pass through the body of the lead frame member. Holes 56 accommodate the flow of plastic therethrough during the assembly process wherein lead frame members 38, 40, and 42 are joined to plastic brush holder assembly 17. By allowing plastic to flow through holes 56 during the assembly process, a secure and durable marriage is accomplished between lead frame members 38, 40, 42 and brush holder assembly 17. Lead frame members 40 and 42 can be similar to lead frame member 38 in that each of the lead frame members 40 and 42 can be formed from a single piece of electrically conductive material and having at least one end that forms a pair of pinching surfaces to pinch an electrical connector and establish an electrical contact with the electrical connector such that the pair of pinching surfaces of the lead frame member are substantially parallel the pinching surfaces of each of the second and third lead frame members. In addition, each of the second and third lead frame members can include a plurality of holes to accommodate the flow of plastic therethrough during an assembly process of the brush holder assembly. This structure is shown in FIGS. 2–4.

An additional benefit provided by forming the electrical connector directly from lead frame member 38 is that it provides for a fairly precise orientation of the connector. This is especially important if the male spade terminals which are to engage the connector descend down from gear cover 20. This will be the case in some embodiments of the present invention wherein electrical male spade terminals are integrally cast into plastic gear cover 20. If the prior art technique for crimping electrical connectors to the ends of the lead frame members was used, the orientation of the crimped on connectors would be critical in order that the proper mating alignment would be established between the connectors formed on the end of lead frame members 38, 40, 42 and their respectively associated male spade terminals descending from plastic cover 20 (male spade terminals descending from plastic cover 20 not shown).

The foregoing detailed description shows that the preferred embodiments of the present invention are well suited to fulfill the objects of the invention. It is recognized that those skilled in the art may make various modifications or additions to the preferred embodiments without departing from the spirit of the present invention. Accordingly, it is to be understood that the subject matter sought to be afforded protection hereby should be deemed to extend to the subject matter defined in the appended claims including all fair equivalents thereof.

What is claimed is:

1. A motor brush holder assembly comprising:
 a plastic brush holder body including first and second openings for respectively accommodating first and second motor brushes; and
 at least one lead frame member formed from a single piece of electrically conductive material defining a pair of pinching surfaces for receiving an electrical connector and a plurality of openings for receiving plastic of the brush holder body.

2. The motor brush holder assembly of claim 1 wherein the electrical connector is integrally cast with respect to a cover of a gear housing.

3. The motor brush holder assembly of claim 2 wherein the plastic brush holder body is positionable in the gear housing.

4. The motor brush holder assembly of claim 3 wherein the electrical connector engages the pinching surfaces when the cover is engaged with the gear housing.

5. The motor brush holder assembly of claim 1 wherein the at least one lead frame further comprises:
 an end for electrically communicating with one of the first and second motor brushes, at least one of the plurality of holes disposed between the pinching surfaces and the end along a length of the at least one lead frame member.

6. The motor brush holder assembly of claim 1 further comprising:
 a second lead frame member formed from a single piece of electrically conductive material defining a pair of pinching surfaces for receiving an electrical connector and a plurality of openings for receiving plastic of the brush holder body wherein the pinching surfaces of the lead frame member and the pinching surfaces of the second lead frame member are parallel with respect to one another.

7. The motor brush holder assembly of claim 6 further comprising:
 a third lead frame member formed from a single piece of electrically conductive material defining a pair of pinching surfaces for receiving an electrical connector and a plurality of openings for receiving plastic of the brush holder body wherein the pinching surfaces of the lead frame member and the pinching surfaces of the third lead frame member are parallel with respect to one another.

8. The motor brush holder assembly of claim 1 further comprising:
 a rotor having a commutator extendable through the brush holder assembly where the at least one lead frame member extends, at least in part, substantially parallel to the commutator.

9. The motor brush holder assembly of claim 1 further comprising:
 a braided wire for joining one of the first and second brushes to the at least one lead frame member.

10. A motor brush holder assembly comprising:
 a plastic brush holder body including first and second openings for respectively accommodating first and second motor brushes; and
 a plurality of frame members each formed from a single piece of electrically conductive material defining a pair of pinching surfaces for receiving an electrical connector and a plurality of openings for receiving plastic of the brush holder body.

11. The motor brush holder assembly of claim 10 wherein each of the plurality of frame members extend, at least in part, substantially parallel with respect to one another.

12. The motor brush holder assembly of claim 10 wherein the pinching surfaces of each of the plurality of frame members are substantially parallel with respect to each other.

13. The motor brush holder assembly of claim 10 wherein the electrical connectors individually receivable by the plurality of lead frame members are integrally cast with respect to a cover of a gear housing and the pinching surfaces are positionable internal with respect to the gear housing.

14. The motor brush holder assembly of claim 13 wherein the electrical connectors engage the pinching surfaces when the cover is engaged with gear housing.

15. The motor brush holder assembly of claim 10 wherein each of the plurality of lead frame members further comprises:

an end for electrically communicating with one of the first and second motor brushes, at least one of the plurality of holes disposed between the pinching surfaces and the end along a length of the corresponding lead frame member.

16. The motor brush holder assembly of claim 10 further comprising:

a rotor having a commutator extendable through the brush holder assembly where at least one of the plurality of lead frame members extends, at least in part, substantially parallel to the commutator.

17. A motor brush holder assembly comprising:

a plastic brush holder body including first and second openings for respectively accommodating first and second motor brushes; and a plurality of frame members each formed from a single piece of electrically conductive material defining a pair of pinching surfaces for receiving an electrical connector and a plurality of openings for receiving plastic of the brush holder body, wherein each of the plurality of lead frame members further comprises an end for electrically communicating with one of the first and second motor brushes, at least one of the plurality of holes disposed between the pinching surfaces and the end along a length of the corresponding lead frame member.

18. The motor brush holder assembly of claim 17 further comprising:

a rotor having a commutator extendable through the brush holder assembly where at least, one of the plurality of lead frame members extends, at least in part, substantially parallel to the commutator.

19. The motor brush holder assembly of claim 17 wherein the pinching surfaces of each of the plurality of frame members are substantially parallel with respect to each other.

20. The motor brush holder assembly of claim 17 wherein the electrical connectors individually receivable by the plurality of lead frame members are integrally cast with respect to a cover of a gear housing and the pinching surfaces are positionable internal with respect to the gear housing.

* * * * *